July 26, 1966  A. D. ALCARO  3,262,470
APPARATUS FOR EXTRUDING AND PANNING DOUGH
Filed Oct. 29, 1963  2 Sheets-Sheet 1

INVENTOR
ANTHONY ALCARO
BY
ATTORNEY

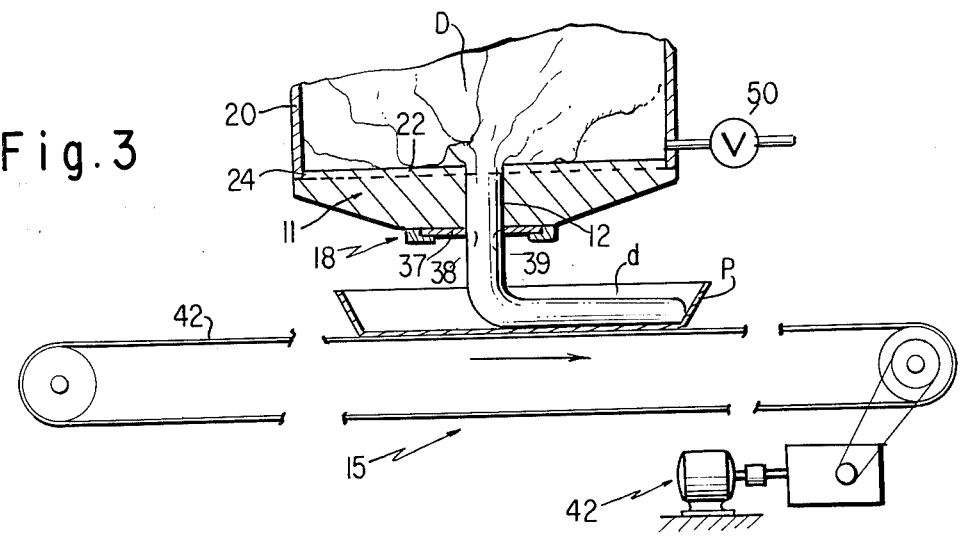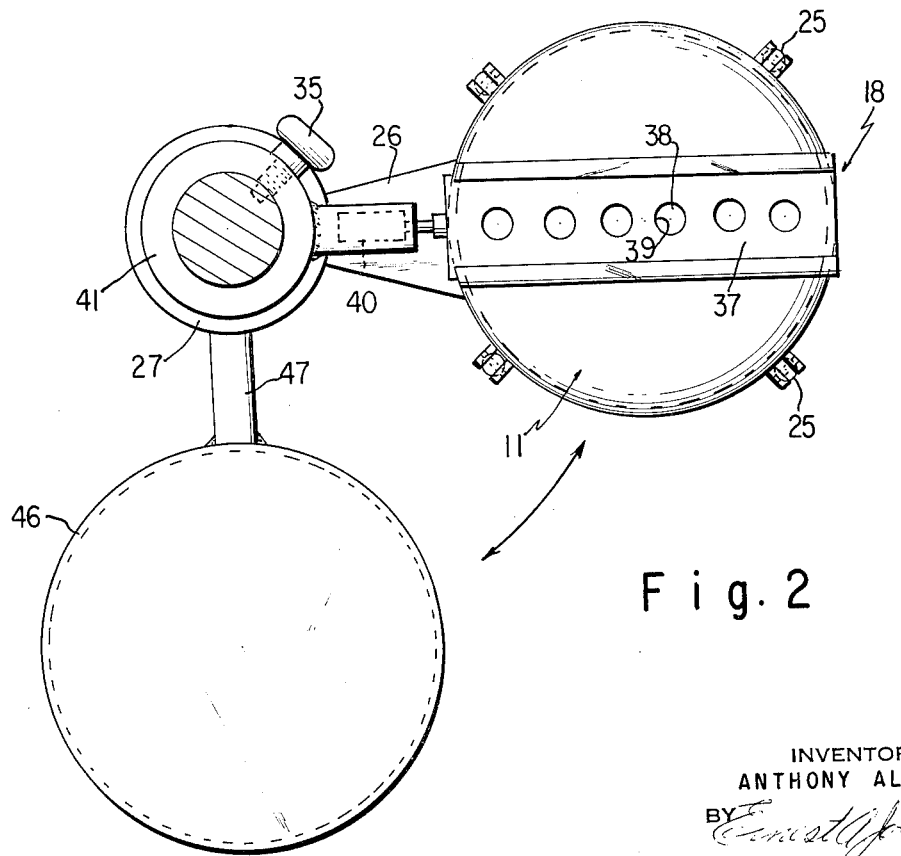

United States Patent Office 3,262,470
Patented July 26, 1966

3,262,470
APPARATUS FOR EXTRUDING AND
PANNING DOUGH
Anthony D. Alcaro, 2 Seymour St., Caldwell, N.J.
Filed Oct. 29, 1963, Ser. No. 319,758
14 Claims. (Cl. 141—129)

The present invention relates to bread making, and, more particularly, to improved apparatus for extruding masses of dough and placing the masses onto pans.

For many years, the conventional machinery for handling bread dough prior to the baking thereof included a dough divider, a rounder, an intermediate proofer, a moulder and a panner. Such machinery required a substantial capital investment, and occupied a considerable amount of floor space in the factory or bake shop. Also, the operations performed by such machinery slowed down the production of bread; and manual supervision was required for these operations to assure that the machinery was functioning properly.

A far more serious objection to such machinery was that the apparatus which divided the dough removed the gases of fermentation from the dough wherefore it was necessary to permit the dough to recover for a period of about ten to twenty minutes before the next step. These divided masses of dough where conditioned for the recovery period by the rounder and this required the use of dusting flour or corn starch to facilitate handling of the dough masses. Extreme care must be exercised in handling the dough to maintain the desired flavor and texture of the bread.

It has been proposed to eliminate the rounding, proofing and moulding operations, and to condition the dough in the dividing apparatus to eliminate the recovery period by the addition of chemicals to the dough to increase the generation of fermentation gases. Here again, extreme care must be exercised to maintain the desired flavor and texture of the bread baked from such dough.

Accordingly, an object of the present invention is to further minimize the machinery required to place masses of dough onto pans by eliminating the use of a separate divider, rounder, proofer, moulder and panner.

Another object is to provide such apparatus which maintains the fermentation of the sponge and dough method without the use of additional chemicals.

Another object is to provide such apparatus for extruding measured and shaped masses of dough and placing the masses directly onto pans or conveyors.

Another object is to provide such apparatus which greatly reduces the cost of machinery heretofore required, eliminates numerous controls, reduces labor and power costs and increases the production rate at which the dough is placed into the pans on conveyors.

Another object is to provide such apparatus which is capable of handling all varieties of doughs such as white, rye, wheat, pumpernickel and others as well as certain leavened cake doughs to form loaves or other shapes of baked products therefrom.

Another object is to provide such apparatus which is readily loaded with a batch of dough and can be thoroughly cleaned after each batch of dough has been extruded.

Another object is to provide such apparatus which can be prearranged to extrude uniform masses of dough of various sizes and shapes.

Another object is to provide such apparatus which can be prearranged to simultaneously extrude a desired number of dough masses to accommodate the pan conveying facilities of the bake shop.

A further object is to accomplish the foregoing in a simple, practical, reliable and economical manner.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawings, forming a part of the specification, wherein:

FIG. 2 is a bottom plan view of the apparatus shown in FIG. 1.

FIG. 3 is a sectional view taken along the line 3—3 on FIG. 1.

Figure 1:
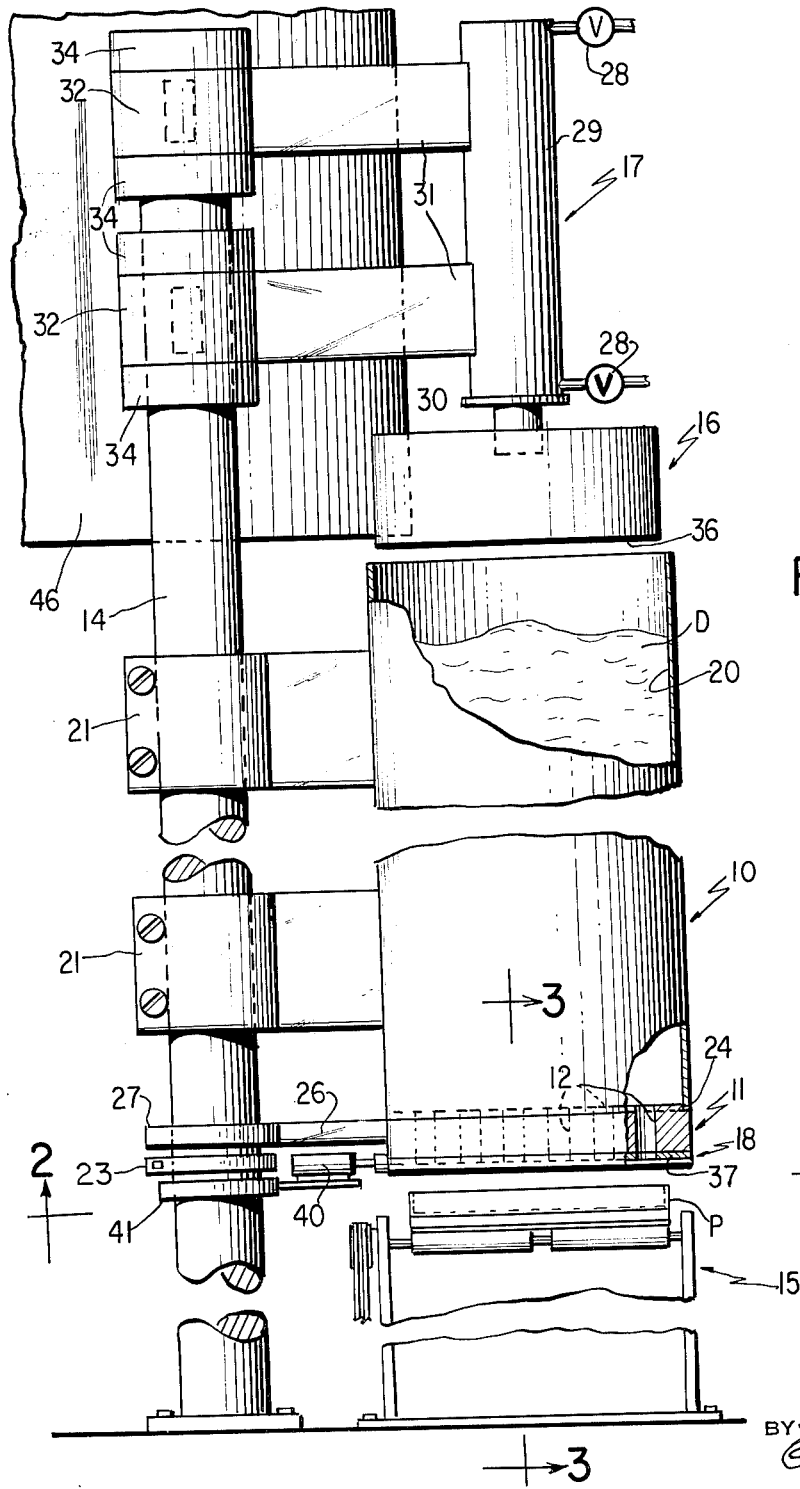
FIG. 1 is a schematic front elevational view of apparatus in accordance with the present invention.

Referring now to the drawings in detail, apparatus is shown which generally comprises an upright cylinder 10 for containing dough D and having a bottom 11 formed with one or more orifices 12, six for example, for extruding the dough therethrough; a vertical column 14 for supporting the cylinder 10 with its bottom 11 spaced from the floor; a conveyor 15 under the bottom of the cylinder for supporting and moving pans P beneath the orifices 12 to receive masses of dough $d$ extruded through the orifices; a piston 16 slidably mounted in the cylinder for applying pressure on the dough D to extrude the same; motor means 17 for effecting up and down movement of the piston; and gate means 18 for opening and closing the orifices periodically for predetermining the length of the dough masses $d$ placed in the pans and for severing the dough masses placed in the pans at the orifice end thereof.

The cylinder 10 has a cylindrical wall 20 which is open at its upper and lower ends and is rigidly secured to and spaced from the column 14 by a pair of brackets 21. The lower end of the column is firmly anchored in the floor F or is otherwise maintained in its vertical position.

The bottom 11 of the cylinder 10 has a flat horizontal upper surface 22 provided with a peripheral recess 24 for receiving the lower end of the cylinder wall 20 so that the surface 22 extends upwardly within the wall to form a closure for the lower end of the cylinder. The bottom 11 is removably secured to the cylinder by a plurality of circumferentially spaced connecting means 25 (FIG. 2), and is mounted on the column by a bracket 26 having a bearing 27 which is slidably and rotatably mounted on the column to enable the bottom 11 to be lowered when disconnected and to swing away from underneath the cylinder 10. A collar 23 secured to the column 14 limits the downward movement of the bearing 27 and provides a support for the bearing while the bracket 26 and the bottom 11 thereon are swung about the column.

The motor means 17 preferably is of the hydraulically powered, telescopic piston (not shown) type to reduce the height thereof, and includes a vertical cylinder 29 and an actuator 30 adapted to be extended downwardly and outwardly from the lower end of the cylinder 29. The piston 16 for the cylinder 10 has its upper end secured to the lower end of the actuator 30 for movement therewith. The pressure applied by the piston 16 on the dough is regulated by valves 28 at the inlet and outlet of the cylinder 29 to control the rate of downward travel of the piston, whereby the rate at which the dough is extruded can be predetermined. The cylinder 29 is mounted on and spaced from the column 14 by a pair of brackets 31 each having a bearing 32 rotatable about the column between a pair of guide collars 34 on the column. The bracket 31 serves to axially align the cylinder 10 and the piston 16 and to enable the piston 16 to be swung away from above the cylinder 10 while cleaning the cylinder or loading it with dough D. Means 35 are provided for removably securing the bearings 32 to the column 14 to prevent rotary movement of the brackets 31 when the piston 16 is aligned with the cylinder 10.

The orifices 12 are arranged in a row having a length about equal to the width of the conveyor 15, and commence at the flat surface 22 and extend downwardly therefrom. Preferably, the lower end of the piston 16 has a flat horizontal bottom surface 36 adapted to be moved into close proximity with the surface 22 to facilitate extruding substantially all of the dough D from the cylinder 10 by way of the orifices 12.

The gate means 18 includes a blade 37 (FIG. 3) which is slidably mounted in a guide frame 33 on the underside of the bottom 11 and is movable back and forth in the direction that the row of orifices extends. This blade has a plurality of spaced apart openings 38 defined by sharp edges 39 which match the lower ends of the orifices 12 when the blade is in its orifice opening position. As the blade is moved to its orifice closing position, the edges 39 sever the trailing ends of the dough mass d at the lower ends of the orifices 12 and the portions of the blade to one side of the openings 38 serve as a closure for the orifices 12.

The blade 37 is reciprocated to control the extrusion of the dough by a motor 40 which is mounted on a bracket 41 removably secured to the column 14 and is adapted to move with the cylinder bottom 11.

The conveyor 15 may be of any conventional type which has an upper strand 42 for supporting and moving crosswise aligned rows of pans lengthwise beneath the orifices 12, and has a motor driven variable speed drive 44 for effecting movement of the pans P at a predetermined rate so that the pans P move at the same speed the dough masses d are extruded whereby the dough masses are laid evenly in the pans.

The speed at which the dough masses are extruded can be varied by adjusting the pressure the piston exerts on the dough D by means of the valves 28. Also, the motor 40 is synchronized with the pans so that the leading ends of the dough masses are laid at the leading ends of the pans and the trailing ends of the dough masses are laid at the trailing ends of the pans to properly place the dough masses in the pans. Such synchronization may be effected by timing means for controlling the motor 40 so that it goes through one cycle of operation at the proper moment each time a row of pans passes under the gate means 18.

In order to facilitate loading the cylinder 10 with dough D a hopper 46 (FIGS. 1 and 2) for guiding a batch of dough into the cylinder 10 is mounted by brackets 47 secured and located on the bearings 32 to place the hopper in alignment with the cylinder 10 when the motor means 17 and piston 16 are swung away from the cylinder 10. Here again the securing means 35 prevent rotary movement of the hopper when aligned with the cylinder 10 during loading thereof.

The elements of the extruding apparatus which are contacted by the dough are constructed of or surfaced with a material which complies with sanitary codes, is adapted to withstand the abrasive nature of the dough and is readily cleaned.

In operation, the cylinder 10 is first loaded with the piston 16 retracted therefrom and swung away and with the hopper 46 positioned over the cylinder 10. The hopper is then swung away, the piston 16 is aligned with the cylinder 10 and the piston is projected into the cylinder by the motor means 17 to pressurize the dough to a predetermined value which is maintained during the entire downward stroke of the piston. The conveyor speed is then adjusted to match the extrusion speed and the gate means 18, which are in synchronism, are caused to operate whereby dough masses d are extruded and laid in the pans P.

After the piston 16 has completed its downward stroke and the dough has been extruded, the piston is retracted from the cylinder 10 and reloading is effected in the manner described hereinbefore. In order to facilitate retraction of the piston, valve means 50 are provided for introducing air between the cylinder bottom surface 22 and the lower surface 36 of the piston 16 (FIG. 3).

At the end of a work period or at such other times the apparatus requires cleaning, the piston 16 is retracted and swung away, the bottom 11 is disconnected, lowered and swung away, and the blade 37 is removed from its slide. The cylinder 10, the bottom 11 and its orifices 12, the blade 37 and the hopper 46 are then readily accessible for thorough and effective cleaning thereof in a convenient manner. Thereafter, the cleaned apparatus can be reassembled and reloaded and can be put into operation again with a minimum of effort.

While the apparatus in accordance with the present invention has been described in connection with placing dough masses into pans for the baking of loaves of bread, it will be understood that the apparatus can also be utilized for placing dough masses of other shapes onto a conveyor.

From the foregoing description, it will be seen that the present invention provides improved apparatus for automatically extruding and placing dough into pans or onto a conveyor in a simple, practical, accurate, reliable and economical manner.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. In apparatus for extruding measured masses of dough and placing the masses directly onto pans, the combination of a cylinder having imperforate side walls for confining dough and having a bottom corresponding in area to the cross-sectional area of said cylinder and provided with orifice means for extruding the dough therethrough, a conveyor under said bottom of said cylinder for supporting and moving pans beneath said orifice means to receive the dough extruded through said orifice means, piston means mounted in said cylinder for applying pressure on the dough therein to extrude the same through said orifice means, said piston means corresponding in cross-sectional area to the area of said bottom, means for driving said piston means so that said piston means is capable of extruding substantially all of the dough confined within said cylinder in a single continuous downward stroke, and means for predetermining the amount of dough extruded onto each pan, said last mentioned means including means for regulating the pressure applied by said piston means on the dough to determine the rate at which the dough is extruded, and means at the outlet of said orifice means for severing the extruded dough when the predetermined amount of dough has been extruded.

2. Apparatus according to claim 1, including means for moving said conveyor at a speed to enable each predetermined amount of extruded dough to be deposited on a pan in a predetermined position.

3. Apparatus according to claim 1, wherein said cylinder has a substantially flat upwardly facing inner surface, and said pressure applying piston means is a piston member having a substantially flat downwardly facing surface adapted to be moved into close proximity with said upwardly facing surface to facilitate extruding substantially all of the dough in said cylinder therefrom.

4. Apparatus according to claim 3, wherein said orifice means include a passageway commencing at said upwardly facing surface and extending downwardly therefrom.

5. Apparatus according to claim 1, wherein said conveyor is arranged to support laterally extending rows of pans thereon and to move the pans in a lengthwise direction, and a laterally extending row of orifice means is provided in said cylinder bottom each in registry with a pan of each laterally extending row of pans.

6. Apparatus according to claim 5, including means at the outlet of each of said orifice means for simultaneously severing the dough extruded from each of said orifice means.

7. Apparatus according to claim 5, including an elongate plate facing the outlets of said orifice means having a row of spaced openings therein each positioned to register with an outlet of said orifice means and provided with a dough dividing edge and having wall portions between said openings positioned to close the outlets of said orifice means; and means for reciprocating said plate lengthwise across said row of orifice means.

8. Apparatus according to claim 1, including valve means for introducing air between the lower end of said piston means and said cylinder bottom.

9. Apparatus according to claim 1, wherein said orifice means include an opening in said cylinder bottom for removably mounting orifice members having bores of various diameters to predetermine the cross-section of the extruded dough.

10. In apparatus for extruding dough onto pans, the combination of an upright member, an upright cylinder supported by said member having an open upper end and having an extruding head at the bottom thereof, a vertically reciprocating motor supported by said member having an actuator at its lower end, and a piston secured to said actuator for slidable movement within said cylinder and withdrawal therefrom, said motor being mounted for swinging about said upright member to move said piston away from said upper cylinder end when said piston is withdrawn from said cylinder.

11. Apparatus according to claim 10, including a hopper and means for moving said hopper into registry with said upper cylinder end and away from said upper cylinder end, said hopper being mounted for swinging about said upright member to facilitate selectively positioning said hopper and said piston above said upper cylinder end.

12. Apparatus according to claim 11, wherein said extrusion head is detachably secured to the lower end of said cylinder to facilitate cleaning thereof, said extrusion head includes means supporting the same on said upright member, and said last mentioned means are constructed and arranged to lower said extrusion head and swing the same away from the lower end of said cylinder when detached therefrom.

13. In apparatus for extruding measured masses of dough and placing the masses directly onto conveying means, the combination of a cylinder having imperforate side walls for confining dough and having a bottom corresponding in area to the cross-sectional area of said cylinder and provided with orifice means for extruding the dough therethrough, conveyor means under said bottom of said cylinder orifice means to receive the dough extruded through said orifice means, piston means mounted in said cylinder for applying pressure on the dough therein to extrude the same through said orifice means, said piston means corresponding in cross-sectional area to the area of said bottom, means for driving said piston means so that said piston means is capable of extruding substantially all of the dough confined within said cylinder in a single continuous downward stroke, and means for predetermining the size of dough masses extruded onto said conveyor means, said last mentioned means including means for regulating the pressure applied by said piston means on the dough to determine the rate at which the dough is extruded, and means at the outlet of said orifice means for severing the extruded dough when the predetermined amount of dough has been extruded.

14. Apparatus according to claim 13, wherein said cylinder has a substantially flat upwardly facing inner surface, and said pressure applying piston means is a piston member having a substantially flat downwardly facing surface adapted to be moved into close proximity with said upwardly facing surface to facilitate extruding substantially all of the dough in said cylinder therefrom.

References Cited by the Examiner

UNITED STATES PATENTS

| 486,762 | 11/1892 | Camden | 141—376 X |
| 1,544,122 | 6/1925 | Barclay | 141—183 X |
| 1,939,400 | 12/1933 | Lerche | 107—14.2 X |
| 2,121,065 | 6/1938 | Anderson | 141—167 X |
| 2,749,005 | 6/1956 | Plusqvellic | 141—188 X |

FOREIGN PATENTS 1,045,838  12/1958  Germany.

LAVERNE D. GEIGER, *Primary Examiner.*

H. BELL, *Assistant Examiner.*